Jan. 13, 1970          V. J. CUSHING          3,489,007
               ELECTROMAGNETIC MASS FLOWMETER
Original Filed June 17, 1966                 2 Sheets-Sheet 2
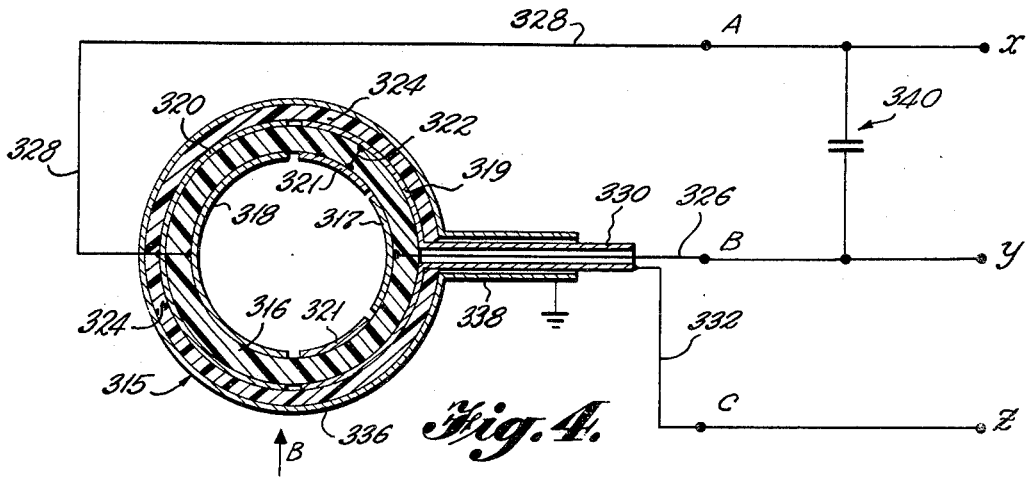
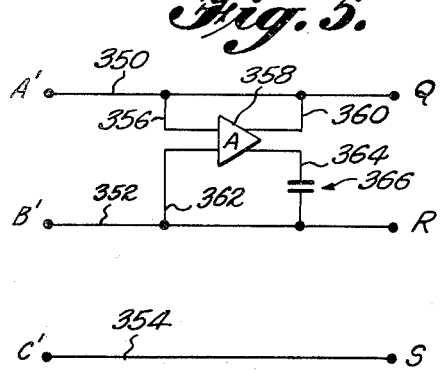
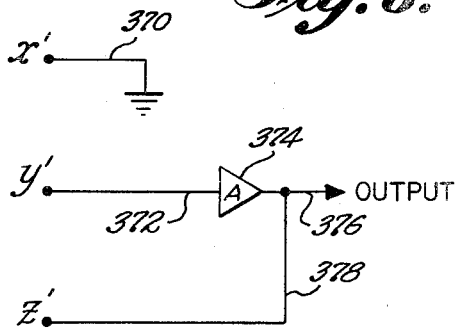
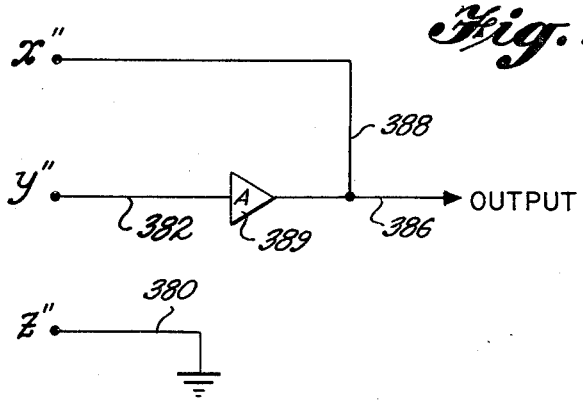
INVENTOR
VINCENT J. CUSHING
BY
Shoemaker and Mattare
ATTORNEYS United States Patent Office
3,489,007
Patented Jan. 13, 1970

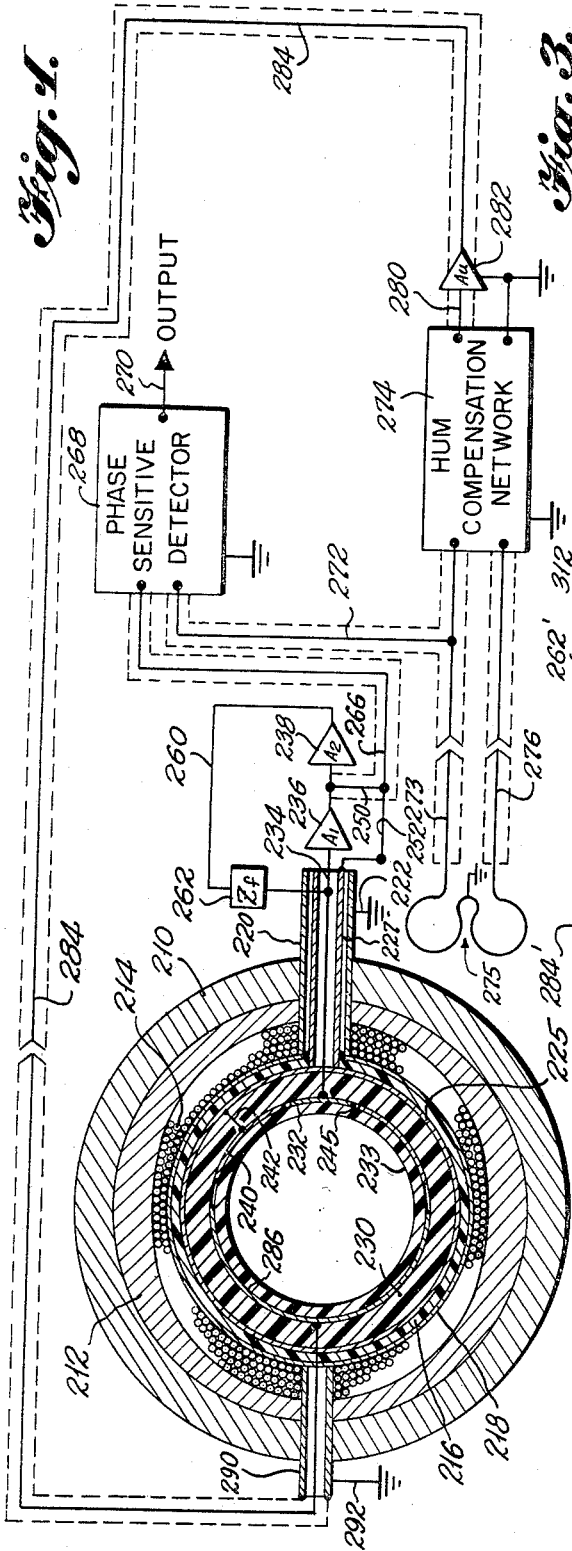
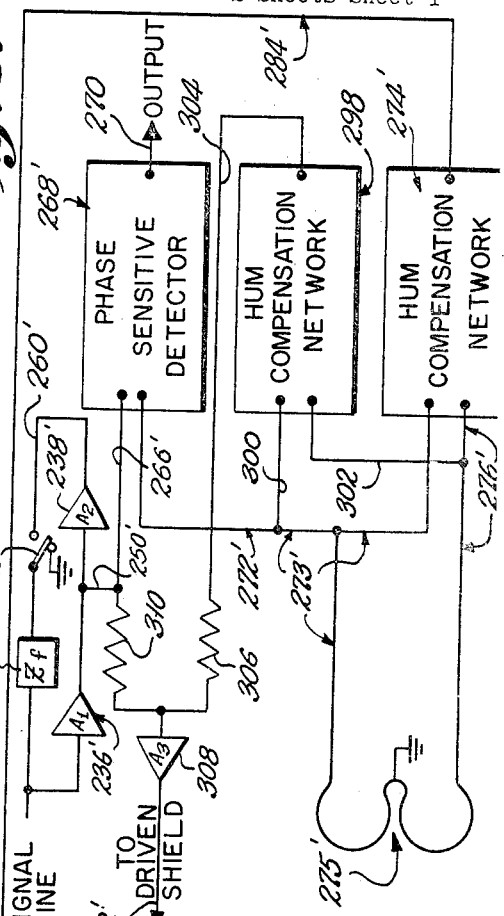
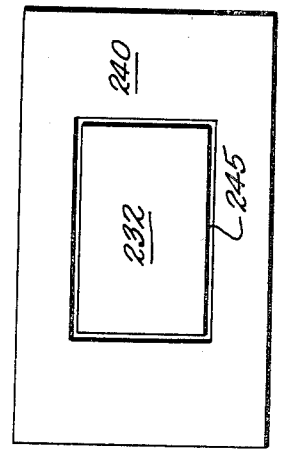

3,489,007
ELECTROMAGNETIC MASS FLOWMETER
Vincent J. Cushing, 9804 Hillridge Drive,
Kensington, Md. 20795
Continuation of application Ser. No. 558,485 June 17, 1966. This application May 6, 1968, Ser. No. 727,095
Int. Cl. G01f 1/00
U.S. Cl. 73—194                10 Claims

ABSTRACT OF THE DISCLOSURE

An electromagnetic flowmeter is provided for measuring mass flow rate for non-polar dielectric fluids. A pair of separate insulated detecting electrodes are provided adjacent a tubular means and an alternating magnetic field is produced in the tubular means. These detecting electrodes are connected in an electrical network, and a certain size capacitance is connected in shunt across the outputs of the detecting electrodes for indicating mass flow. The magnitude of the capacitance is critical.

---

Certain features of the invention described herein were made in the performance of work under a NASA contract and are subject to the provisions of the National Aeronautics and Space Act of 1958, Public Law 85–568 (72 Stat. 426; 42 U.S.C. 2451), as amended.

The present application is a continuation of Ser. No. 558,485, filed June 17, 1966, now abandoned. Application Ser. No. 558,485 was a continuation-in-part of copending U.S. application Ser. No. 449,930, filed Apr. 14, 1965, now U.S. Patent No. 3,274,831.

The present invention relates to an electromagnetic mass flowmeter, and more particularly to a flowmeter for measuring mass flow rate for all non-polar dielectric fluids.

The present invention is especially adapted for use with non-polar dielectric fluids and is capable of accurately measuring mass flow rate regardless of the phase of the metered fluid, whether this phase be solid, liquid or gaseous. It may be made to work with polar fluids as well, but there generally one must take into account the temperature of the fluid.

In the arrangement of the present invention, at least two separate detecting electrodes are electrically insulated from one another and are provided adjacent a tubular means through which the metered fluid is adapted to flow. Means is provided for producing an alternating magnetic field within this tubular means. These detecting electrodes are connected in an electrical network which electrically connects the detecting electrodes and which includes a portion disposed outwardly of the transducer means discussed hereinabove.

The present invention is based upon the discovery that the desired indication of mass flow rate may be obtained by placing a certain size capacitance in shunt across the outputs of the aforementioned detecting electrodes. The magnitude of this added capacitance is of a critical nature as hereinafter discussed in detail. The added capacitance may be produced either by providing a natural or structural capacitance of suitable magnitude between the outputs of the detecting electrodes or it may be synthesized by providing electronic feedback or the like.

The flowmeter of the present invention may also employ a guard means in combination with the detecting electrodes, this guard means including a shield means disposed directly outwardly of at least one of the detecting electrodes in order to minimize current losses from the detecting electrodes to ground to obtain accurate results with the apparatus. The guard means also includes a guard ring disposed about an associated detecting electrode and spaced substantially uniformly from the outer edges thereof for obviating the problem of so-called end-shorting, the guard ring and shield means being electrically interconnected with one another. It is especially important that the guard ring portion of the guard means be associated with each relatively high impedance detecting electrode of the transducer means.

An object of the present invention is to provide a new and novel electromagnetic mass flowmeter which is especially adapted for use with non-polar dielectric fluids.

Another object of the invention is the provision of a mass flowmeter which will accurately measure mass flow rate regardless of the phase of the metered fluid whether it be solid, liquid or gaseous in nature.

Still another object of the invention is to provide a mass flowmeter including means for minimizing current losses from the detecting electrodes to ground and further to eliminate the problem of so-called end-shorting of the high impedance detecting electrode.

Yet another object of the invention is to provide a mass flowmeter which is quite simple and inexpensive in construction, is relatively lightweight and of small size, and which at the same time is quite efficient and reliable in use.

Other objects and many attendant advantages of the invention will become more apparent when considered in connection with the specification and accompanying drawings, wherein:

FIG. 1 is a somewhat schematic illustration of flowmeter apparatus according to the present invention;

FIG. 2 is a view illustrating a detecting electrode and its associated guard ring in its developed or planar form;

FIG. 3 is a schematic wiring diagram of a modified form of electrical network to be employed in the apparatus shown in FIG. 1;

FIG. 4 is a schematic illustration of a modified electromagnetic mass flowmeter according to the present invention;

FIG. 5 illustrates a further modified form of the invention;

FIG. 6 illustrates a first typical output circuit; and

FIG. 7 illustrates a second typical output circuit which may be employed in the present invention.

Referring now particularly to FIGS. 1 and 2 of the drawings, an outer casing or enclosure 210 surrounds a body of magnetic permeable material 212 which in turn is disposed about the magnet winding 214. It will be noted that the body of permeable material 212 may be contoured to maintain the inner surface of the body of permeable material 212 closely adjacent to the outer surface of the magnetic winding.

A tubular member 216 formed of suitable dielectric material such as fiber glass, plastic and the like supports a ground means 218 on the outer surface thereof, this ground means defining a substantially cylindrical configuration and preferably being formed either as a gridwork or as a thin metallic foil. Ground means 218 is connected with a cylindrical conductive portion 220 which forms the outer portion of a triaxial transmission line, portion 220 being connected with ground through a lead 222.

The shield means is indicated by reference numeral 225 and is disposed between the inner surface of member 216 and the outer surface of member 230, this shield means being preferably formed as a gridwork or as a thin sheet of metallic foil. The shield 225 is connected with the intermediate cylindrical portion 227 of the triaxial transmission line.

A tubular member 230 formed of suitable dielectric material such as fiber glass or the like is disposed inwardly of the tubular member 216, with the shield means 225 interposed between the two tubular members 230 and 216. The detecting electrode means includes a relatively low impedance electrode described hereinafter and an opposed relatively high impedance detecting electrode 232 which is disposed at the inner surface of tubular member 230 and which is interposed between this tubular member and the innermost tubular member 233. Member 233 is formed of suitable dielectric material such as Teflon, Mylar or the like, the liquid being adapted to flow through member 233, it being understood that member 233 may be eliminated if desired as, for example, where the metallic electrodes are chemically resistant to the metered fluid.

Detecting electrode 232 is connected to a line 234 which forms the innermost portion of the triaxial transmission line. Line 234 is in turn connected with the input of the first stage 236 of an amplifier means, the output of which is connected with a second stage 238.

Guard ring means 240 is interposed between tubular members 230 and 233, the guard ring means being connected with the shield means 225 through the intermediary of a lead 242. Referring now to FIG. 2, the developed or planar form of the detecting electrode 232 and the guard ring means 240 is illustrated. As seen in this figure, it will be noted that the detecting electrode 232 is substantially rectangular in configuration. The guard ring means 240 is also substantially rectangular and includes a central rectangular cutout portion which is slightly greater than the detecting electrode 232 so as to provide a clearance 245 all the way around the outer edges of the detecting electrode. Accordingly, when the two electrodes as seen in FIG. 2 are disposed in operative position, it will be understood that the guard ring means is disposed in spaced relationship with the detecting electrode and provides a substantially uniform spacing completely around the peripheral edge portions of the detecting electrode.

The output of the first stage 236 of the amplifier means is connected through a shielded lead 250 with a lead 252 which in turn is connected with the cylindrical member 227 connected with the shield means 225 which in turn through the intermediary of lead 242 is electrically connected with the guard ring means. The gain of the portion 236 of the amplifier means is unity, the shield means 225 as well as the guard ring means 240 being driven at unit gain from the output of portion 236 of the amplifier means. Accordingly, there is no flow-generated potential difference between the detecting electrode 232 and the adjacent guard means including the guard ring means and shield means, thereby eliminating the effect of the aforementioned fringe capacity and ground capacity.

For measurement of volumetric flow, as described in the aforementioned patent, the invention also employs regenerative feedback and it will be noted that the output of portion 238 of the amplifier means is connected by means of a lead 260 through an impedance means 262 with the lead 234 connecting the detecting electrode to the input of the amplifier means. This arrangement provides a regenerative feedback path from the output of the amplifier means to the input thereof through the feedback impedance 262 which may in a typical example take the form of a high quality temperature stabilized capacitor. The proper gain setting of amplifier portion $A_2$ may be established in terms of flowmeter and amplifier circuit parameters which are entirely independent of the electrical properties of the fluid. With the gain setting suitably established, the detected voltage is equal to the flow generated voltage regardless of the electrical properties of the fluid. This very desirable operating feature is achieved by regeneratively feeding back into the flow detection circuit through the impedance $Z_f$ the output of the detection amplifier.

Thus for a certain gain setting $A_2$ the instrument provides an indication of the volumetric flow rate. But furthermore, it is found that the instrument can be made to indicate mass flow rate by selecting a different gain setting for $A_2$, as described later.

The amplifier means is also connected through a lead 266 with a phase-sensitive detector 268 which in turn has the output thereof connected through a lead 270 with a suitable output means.

The phase-sensitive detector means is in turn connected through a lead 272 with a lead 273 which in turn is connected with a hum compensation network 274. A lead 276 additionally connects the hum compensation network with a reference loop indicated generally by reference numeral 275 which is suitably disposed in the magnetic field of the transducer.

The output of the hum compensation network is connected through a lead 280 with a hum compensation amplifier 282 the output of which is connected through a lead 284 with detecting electrode 286 which is interposed between the tubular members 230 and 233. A tubular shield portion 290 is illustrated as being in surrounding relationship to the lead 284 extending outwardly from the compensation electrode 286. This shield means is in turn connectedt hrough a lead 292 with ground. It will further be noted that the various leads 266, 272, 273, 280 and 284 are each illustrated as being surrounded by a suitable shield means as indicated by the dotted lines such that all of these leads are of a shielded wire configuration. This shield means may consist of sufficiently thin foil such that while the foil will serve as an excellent electrostatic shield, it will give rise to negligible eddy currents and disturbance to the magnetic field. This is especially important in shielding those portions of leads 234 and 284 which extend radially outwardly from the electrodes 232 and 286 respectively.

Referring now to FIG. 3, a modification of the invention is illustrated wherein a different form of an electrical network is provided for connection with the transducer portion of the apparatus.

The portions of the electrical circuit shown in FIG. 3 which are similar to that discussed in connection with FIG. 1 have been given the same reference numerals primed. It will be noticed that hum compensation network 274' is connected in substantially the same manner as hum compensation network 274, the output signal from this network being fed into the transmission line 284'. However, as seen in FIG. 3, an additional hum compensation network is indicated generally by reference numeral 298 and is also connected with reference loop 275' by means of leads 300 and 302. The output of network 298 is connected witha lead 304 which in turn is connected through a resistor 306 with the input of a driven shield buffer amplifier 308 the outppt of which is connected with lead 252' corresponding to lead 252 as seen in FIG. 1.

The output of amplifier portion 236' is connected through the intermediary of lead 250' with a resistor 310 so that the output of amplifier portion 236' is also fed to the input of the buffer amplifier 308.

The two resistors 306 and 310 form a rudimentary adder circuit, and if the two resistor values are equal, then the input to amplifier 308 is equal to one-half the sum of the output of hum compensation network 298 and the output of the first stage amplifier 236'.

It will be noted that in this modified form of the invention, a hum compensation network is provided having a portion thereof operatively associated with the magnetic field of the apparatus and wherein the output of such hum compensation network is connected with the shield means.

With this arrangement, the hum compensation network automatically assures that the hum voltage is substantially nulled during all phases of operation regardless of changes in the hum voltage caused by changes in the electrical conductivity and the dielectric constant of both the tubular fluid conducting means as well as the metered fluid.

If resistors 306 and 310 are equal, then we require that $$A_1 A_3 = 2$$

in order that the shield means be driven at unit gain with respect to the flow-generated voltage. The virtue of the additional hum compensation means is that the compensation remains effective even if the dielectric properties of the flowpipe should change as for example when subjected to severe temperature changes. This additional hum compensation means is accordingly particularly valuable where the flow conduit is subjected to severe thermal shock.

As seen in FIG. 3, the feedback impedance 262′ may be optionally attached by means of a selectively operable switch 312 to the output of amplifier portion 238′, or to circuit ground when it is desired to measure mass flow.

When switch 312 is in the full line position shown in FIG. 3, a capacitance represented by impedance means 262′ is effectively provided between the outputs of the detecting electrodes insofar as the flow-generated voltage is concerned. This capacitance has a certain critical value as hereinafter defined.

Referring now to FIG. 4 of the drawings, the transducer portion of the apparatus is indicated generally by reference numeral 315 and is shown in cross section similar to the illustration of FIG. 1. The transducer portion includes a generally cylindrical tubular means 316 of dielectric material havign the necessary dielectric and magnetic properties. This tubular means may be similar to that previously described. A pair of detecting electrodes 317 and 318 are provided, these electrodes being separate and electrically insulated from one another and disposed preferably at diametrically opposite inner portions of member 316. As illustrated, detecting electrodes 317 and 318 are suitably supported on the inner sruface of member 316 and are in direct contact with fluid flowing through the tubular means. If desired, a thin liner of suitable dielectric material such as Teflon or the like may be provided inwardly of electrodes 317 and 318 and in concentric relationship with member 316.

The transducer portion includes guard means including a pair of shield means 319 and 320 each of which is disposed substantially directly outwardly of the associated detecting electrodes 317 and 318 respectively. In this modification, the two shield means are spaced from one another so as to be insulated from one another. These shield means as well as the detecting electrodes are formed of a suitable electrically conductive metallic substance such as copper or the like as are the corresponding elements in the previously described modification and should be thin to minimize eddy currents.

The guard means of this form of the invention also includes a guard ring 321 which is suitably mounted on the inner surface of member 316 and is interconnected with shield means 319 by electrical lead 322. The guard ring 321 and the associated detecting electrode 317 may be of the identical construction as members 240 and 232 previously described and illustrated in FIG. 2.

The shield means 319 and 320 are mounted on the outer surface of member 316 and are in turn surrounded by a generally cylindrical mmeber 324 which may be of a suitable dielectric material similar to that of member 316.

It should be understood that the components hereinbefore described in connection with FIG. 4 are associated with a suitable means for generating an alternating magnetic field similar to the arrangement shown in FIG. 1, this field being indicated schematically by the symbol B in FIG. 4.

An electrical lead 326 is connected with detecting electrode 317 which in the present example is a relatively high impedance detecting electrode, lead 326 extending outwardly of the transducer and being connected with a contact Y.

A lead 328 is connected with detecting electrode 318 which in the configuration of FIG. 4 is a relatively low impedance detecting electrode, lead 328 extending outwardly of the transducer portion of the apparatus and being connected with a contact X.

A tubular lead 330 is substantially coaxial with lead 326 and is electrically connected with the guard means portion of the present invention including shield means 319 and guard ring 321. Tubular lead 330 is connected with a lead 332 which in turn is connected with a contact Z.

Member 324 of the transducer may further be surrounded by a ground means 336 in the form of an electrically conductive layer of material connected with a coaxial lead 338 which in turn is connected with ground.

It will be understood that in the transducer shown in FIG. 4, the flow of fluid is perpendicular to the plane of the paper and that the alternating magnetic induction B is transverse to the axis of the tubular means through which the fluid flows. In this embodiment, detecting electrode 318 is at a very low impedance level relative to ground, while detecting electrode 317 is a relatively high impedance electrode. If it is desired that both detecting electrodes be operated at a high impedance level, the left-hand side of the transducer section as seen in FIG. 1 would be identical with the right-hand side, or in other words, detecting electrode 318 would be of a similar dimension to detecting electrode 317 and would be provided with a guard ring similar to guard ring 321 in association with detecting electrode 317. The over-all arrangement would then be completely symmetric. Both detecting electrodes may be maintained at a high impedance level if it is desired to employ a balanced or push-pull output system wherein the leads 326 and 328 would be connected with the inputs of a balanced or differential amplifier. For simplicity of illustration, a single-sided arrangement is shown. It will also be understood that the arrangement shown in FIG. 1 may in a similar manner be made symmetric for connection with a balanced or push-pull output system.

As illustrated in FIG. 4, the detecting electrodes and the guard ring are disposed at substantially the same radial distance from the center of the tubular means through which the fluid flows. The shield means 319 and 320 are disposed at a greater radius from the center of the tubular means and are separated from the detecting electrodes by a dielectric medium.

It should be noted that the tubular means and the associated components may have a cross-sectional configuration other than circular if so desired, the illustrated embodiment being considered preferable.

As illustrated in FIG. 4, the mass flow loading capacitance provided between the outputs of the detecting electrodes 317 and 318 comprises a structural capacitor 340 connected between leads 326 and 328. This capacitor has a certain critical value and it has been found that in order to obtain the desired indication of mass flow rate, the capacitance between the outputs of the detecting electrodes should be approximately twice the internal direct capacitance between detecting electrodes 317 and 318 when the flowmeter is empty. This relationship can be expressed with the following equation:

$$C_{340} = 2 C_{317-318}$$

where $C_{340}$ is the capacitance of capacitor 340, and $C_{317-318}$ is the internal direct capacitance between electrodes 317 and 318 when the flowmeter is empty.

Referring now to FIG. 5 of the drawings, a modification of the embodiment shown in FIG. 4 is illustrated wherein that portion of the circuit to the right of the points marked A, B and C of FIG. 4 have substituted therefor the portion of the circuit shown to the right of the contacts identified as A′, B′ and C′ shown in FIG. 5. In other words, the transducer portion of the structure would remain the same, and the circuit portion including contacts A', B' and C' and contacts Q, R and S as shown in FIG. 5 would be substituted for the corresponding circuit portions A, B and C and X, Y and Z of FIG. 4. Another way of expressing this is to say that leads 328, 326 and 332 from the transducer portion of FIG. 4 would be connected with the contacts A', B' and C' of FIG. 5.

Lead 350 connects contacts A' and Q, while a lead 352 connects contacts B' and R, and a lead 354 connects contacts C' and S. A lead 356 connects lead 350 with the input of an amplifier 358 the output of which is connected by a lead 360 to lead 350. A lead 362 connects lead 352 with the input of amplifier 358 the output of the amplifier being connected by lead 364 through a capacitor 366 to lead 352. In this modification, the structural capacitor 366 and its associated amplifier 358 provides a synthetic capacitance between the outputs of the detecting electrodes in an amount equal to $(1-A_{358})C_{366}$ where $A_{358}$ represents the gain of the amplifier and $C_{366}$ represents the capacitance of capacitor 366. Here again, the synthetic capacitance should be approximately equal to twice the internal direct capacitance between detecting electrodes 317 and 318 when the flowmeter is empty. This relationship can be expressed by the following equation:

$$(1-A_{358})C_{366}=2C_{317-318}$$

Capacitance 366 may, if desired, comprise the capacity between the high impedance electrodes and its associated guard means.

It will also be apparent that a combination of an actual structural capacitor as shown in FIG. 4 plus a synthetic capacitance as shown in FIG. 5 may be employed, and in such a case, the relationship of the capacitances may be expressed as follows:

$$C_{340}+(1-A_{358})C_{366}=2C_{317-318}$$

It should be understood in connection with the discussion of the capacitance provided between the outputs of the detecting electrodes that the stray capacity from the detecting electrodes to ground must be taken into consideration, and the parasitic capacity between the detecting electrodes in combination with either an actual or synthetic capacitance must be such that it is substantially twice the internal direct capacity between the detecting elecrodes when the flowmeter is empty.

In actual practice, the requirement for setting the mass flow loading capacitance at a value of approximately twice that of the internal direct capacitance between the detecting electrodes when the flowmeter is empty may be very slightly changed for very precise work. When such precise work is involved, the right-hand term of the above equation may be rewirtten as:

$$[(2+\epsilon)/(1-\epsilon)]C_{317-318}$$

where $\epsilon$ is a small correction. The term "$\epsilon$" is derived from the well-known Clausiuc-Mossotti relationship indicated by the following equation:

$$(K+2)/(K-1)=1/M\rho+\epsilon$$

where K is the relative permittivity of the metered material, $\rho$ is the density of the material, and M is a constant peculiar to the chemical species which make up the non-polar material. Except for very precise work, the term "$\epsilon$" may be considered zero.

Accordingly, it will be understood that while the mass flow loading capacitance between the outputs of the detecting electrodes is approximately equal to twice the internal direct capacitance between the detecting electrodes when the flowmeter is empty, this value may change very slightly in the case of very precise work.

It is also important that any structural capacitor or synthetic capacitance as the case may be should be of such a construction that the materials thereof have adequate temperature stability so that the proper magnitude of capacitance loading is maintained during operation of the mass flowmeter apparatus.

Referring now to FIG. 6 of the drawings, an output circuit is illustrated, this output circuit representing one of a number of output circuits which would be suitable for use with the flowmeter apparatus hereinabove described. In the circuit shown in FIG. 6, three contacts X', Y' and Z' are provided, these contacts being adapted to be connected with the contacts X, Y and Z as illustrated in FIG. 4 or the contacts Q, R and S respectively as illustrated in FIG. 5.

Contact X' of FIG. 6 is connected by lead 370 to ground whereby it will be understood that the detecting electrode 318 as shown in FIG. 4 will be connected with ground.

Referring again to FIG. 6, contact Y' is connected by lead 372 with the input of an amplifier 374 the output of which is connected with a lead 376 which in turn is connected with a suitable output means. Lead 376 in turn is connected by lead 378 with contact Z'.

In the arrangement as shown in FIG. 6, substantially unit gain feedback is provided from the output of amplifier 374 through lead 378 so that the guard means including shield 319 and the guard ring 321 of FIG. 4 will be maintained at substantially the same flow generated potential as the relatively high impedance detecting electrode 317 associated therewith.

Referring now to FIG. 7, contacts X", Y" and Z" are adapted to be connected with the contacts X, Y and Z respectively of FIG. 4 or alternatively the contacts Q, R and S respectively of FIG. 5.

As seen in FIG. 7, contact Z" is connected by means of lead 380 with ground whereby the guard means including the shield means 319 and guard ring 321 of FIG. 4 are connected with ground.

Contact Y" of FIG. 7 is connected by lead 382 with the input of an amplifier 384 the output of which is connected with a lead 386 which in turn is connected with a suitable output means. A lead 388 connects output lead 386 from amplifier 384 with the contact X".

In the modification shown in FIG. 7, a large negative feedback is provided from the output of the amplifier 384 through lead 388 to detecting electrode 318 of FIG. 4 which drives detecting electrode 317 toward zero potential so that it will be at substantially the same flow generated potential as the associated guard means which is grounded by lead 380 as seen in FIG. 7.

It will accordingly be apparent that in each of the output circuits as shown in FIGS. 6 and 7, means is provided for maintaining the relatively high impedance detecting electrode and the associated guard means at substantially the same flow generated potential.

It is apparent from the foregoing that there is provided according to the present invention new and novel electromagnetic mass flowmeter apparatus which is especially adapted for use with non-polar dielectric fluids. The flowmeter is adapted to accurately measure mass flow rate regardless of the phase of the metered fluid whether it be solid, liquid or gaseous in nature. Means is provided for minimizing current losses from the detecting electrodes to ground and further eliminating the problem of so-called end-shorting of a relatively high impedance detecting electrode. The apparatus is quite simple and inexpensive in construction, is relatively lightweight and of small size, and at the same time is quite efficient and reliable in use.

What is claimed is:

1. Magnetic flowmeter apparatus comprising transducer means including tubular means of dielectric material through which fluid is adapted to flow, means for producing an alternating magnetic field within said tubular means, detecting means adjacent said tubular means and within said magnetic field for detecting electrical signals in the fluid flowing through said tubular means, said detecting means including at least two separate detecting electrodes electrically insulated from one another, an electrical network electrically connected with the detecting electrodes of said transducer means, and means for reducing the stray capacitance of the flowmeter and means externally of the transducer means for providing between the outputs of said detecting electrodes a mass flow loading capacitance including stray capacitance which is approximately equal to twice the internal direct capacitance between said detecting electrodes when the flowmeter is empty.

2. Apparatus as defined in claim 1 wherein one of said detecting electrodes is a relatively high impedance detecting electrode and another of said detecting electrodes is a relatively low impedance detecting electrode.

3. Apparatus as defined in claim 1 wherein at least one of said two detecting electrodes is a relatively high impedance detecting electrode.

4. Apparatus as defined in claim 1 wherein said means for providing a mass flow loading capacitance comprises a structural capacitor connected between the outputs of said two detecting electrodes.

5. Magnetic flowmeter apparatus comprising transducer means including tubular means of dielectric material through which fluid is adapted to flow, means for producing an alternating magnetic field within said tubular means, detecting means adjacent said tubular means and within said magnetic field for detecting electrical signals in the fluid flowing through said tubular means, said detecting means including at least two separate detecting electrodes electrically insulated from one another, an electrical network electrically connected with the detecting electrodes of said transducer means, and means for providing externally of the transducer means a mass flow loading capacitance between the outputs of said detecting electrodes which is approximately equal to twice the internal direct capacitance between said detecting electrodes when the flowmeter is empty, and guard means adjacent to and insulated from at least one of said detecting electrodes, said guard means including a shield means disposed outwardly of said one detecting electrode, said electrical network including means for establishing substantially the same flow generated electrical potential on said guard means and said one detecting electrode.

6. Apparatus as defined in claim 5 wherein said one detecting electrode is a relatively high impedance detecting electrode, another detecting electrode being a relatively low impedance detecting electrode.

7. Apparatus as defined in claim 5 wherein at least one of the said detecting electrodes is a relatively low impedance detecting electrode.

8. Apparatus as defined in claim 5 wherein said means for providing a mass flow loading capacitance comprises a structural capacitor connected between the outputs of said two detecting electrodes.

9. Apparatus as defined in claim 5 wherein said means for providing a synthetic shunting capacitance between a structural capacitor and an associated amplifier means for providing a synthetic shunting capacitancee between the outputs of said two detecting electrodes.

10. Magnetic flowmeter apparatus comprising transducer means including tubular means of dielectric material through which fluid is adapted to flow, means for producing an alternating magnetic field within said tubular means, detecting means adjacent said tubular means and within said magnetic field for detecting electrical signals in the fluid flowing through said tubular means, said detecting means including at least two separate detecting electrodes electrically insulated from one another, an electrical network electrically connected with the detecting electrodes of said transducer means, and means for providing externally of the transducer means a mass flow loading capacitance between the outputs of said detecting electrodes which is approximately equal to twice the internal direct capacitance between said detecting electrodes when the flowmeter is empty, said means for providing a mass flow loading capacitance including stray capacitance, a structural capacitor and an associated amplifier means connected to provide a synthetic positive shunting capacitance between the outputs of said two detecting electrodes.

References Cited

UNITED STATES PATENTS

| | | |
|---|---|---|
| 2,733,604 | 2/1956 | Coulter. |
| 2,771,771 | 11/1956 | Kamp et al. |
| 3,178,941 | 4/1965 | Berry. |
| 3,201,986 | 8/1965 | Robinson. |

CHARLES A. RUEHL, Primary Examiner